Figure 1:
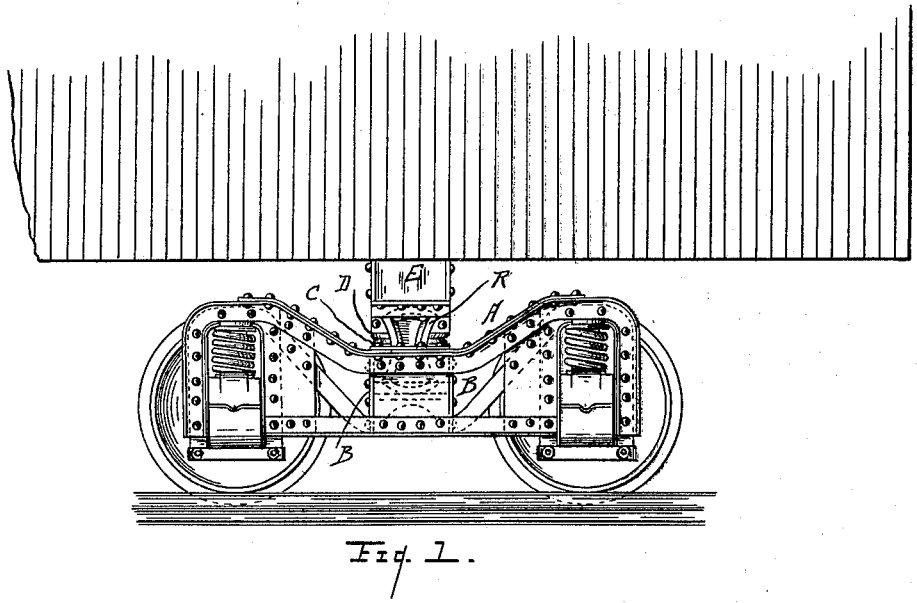

No. 627,169. Patented June 20, 1899.
W. W. WOOLL.
SIDE BEARING FOR RAILWAY CARS.
(Application filed Nov. 6, 1897.)
(No Model.)

WITNESSES
Chas Misner
V. M. Clough.

INVENTOR
William W. Wooll
By Parker & Burton
Attorneys.

THE NORRIS PETERS CO., PHOTO-LITHO., WASHINGTON, D. C.

UNITED STATES PATENT OFFICE.

WILLIAM W. WOOLL, OF DETROIT, MICHIGAN.

SIDE BEARING FOR RAILWAY-CARS.

SPECIFICATION forming part of Letters Patent No. 627,169, dated June 20, 1899.

Application filed November 6, 1897. Serial No. 657,609. (No model.)

*To all whom it may concern:*

Be it known that I, WILLIAM W. WOOLL, a citizen of the United States, residing at Detroit, county of Wayne, State of Michigan, have invented a certain new and useful Improvement in Side Bearings for Railway-Cars; and I declare the following to be a full, clear, and exact description of the invention, such as will enable others skilled in the art to which it pertains to make and use the same, reference being had to the accompanying drawings, which form a part of this specification.

This invention relates to side bearings for railway - cars. Cars are supported upon trucks with a single bearing-point, the truck being so arranged as to have a limited rotation in a horizontal plane beneath the car, and as power used to move the train of cars is applied to the car-body the car-truck, in addition to supporting the car, becomes a trailing device, guided in its course by the flanges of the wheels of the truck against the rails. Manifestly great friction occurs between that portion of the car in contact with the truck-frame, and as this point of pivotal connection must be located midway between the wheels of the truck it follows that the truck-frame must be made correspondingly heavy and strong.

In the present invention I have conceived means whereby four additional bearings will be afforded between the truck-frame and the car-body, one on each end or side of each truck. These side bearings are adapted to any form of truck-frame wherein sufficient space is afforded for the bearing between the car-body and the truck-frame.

The development of modern commerce has compelled the use of freight - cars capable of supporting and transporting very much heavier loads than was deemed necessary or possible up to a very recent date, and these heavier cars, with their increased loads, have demonstrated the necessity of improving the means of connecting the car-trucks to the car in order that the latter may ride easily thereon and the trucks swing freely when passing around curves in the road - bed. Among the several disadvantages that have developed in the present style of car-truck connection may be mentioned the fact that not infrequently the transom of the car-truck under the excessive weight of the car and its contents upon one central bearing-point becomes deflected and is given a permanent set. This causes difficulty in the swinging of the truck beneath the car, because altering the position of portions of the central bearing-surfaces.

By placing side bearings between the frame of the truck and the car at points as near the side of the car and truck-frame as possible I not only multiply the bearing-surfaces, thereby equalizing the weight of the car and its contents upon the truck, but I provide means whereby the greater portion of the weight is sustained by the strongest part of the truck-frame. I am thus enabled to construct not only a lighter truck-transom, but a lighter truck-frame as a whole.

As heretofore constructed the weight of the car and its contents upon the central bearing-point of the truck has caused great friction between the two bearing-surfaces, and consequently in the rotation of the truck great friction between the flanges of the wheel and the rails, thereby causing undue wear and tear on the flanges of the wheels and considerable loss in the waste of power necessary to overcome said friction.

A further feature of my invention therefore consists in so providing these side bearings that the car and its load will be supported upon the truck with a minimum amount of friction, whereby the rotation of the truck under the car will be nearly frictionless and the truck respond readily when the flanges engage the curved portions of the track-rail.

These and other features of my invention are illustrated in the accompanying drawings and will be more specifically set forth in the claims appended hereto.

Figure 2:
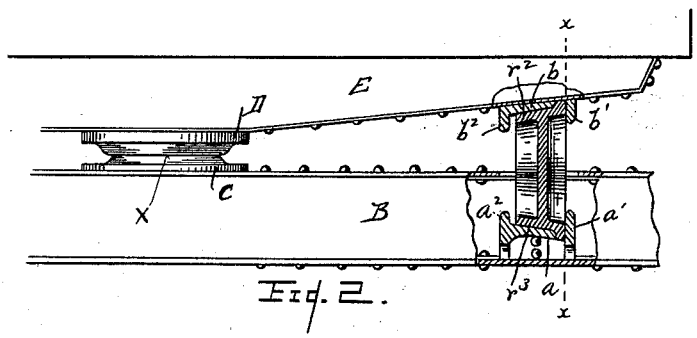
Figure 3:
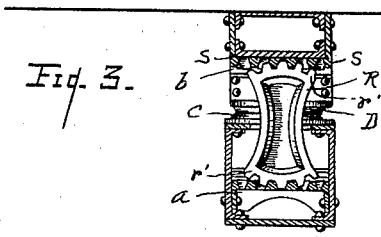
Figure 4:
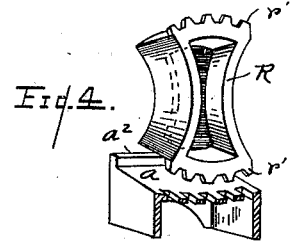

In the drawings, Figure 1 is an elevation of the truck and bearing as seen from the side of the car. Fig. 2 is a front elevation of the truck-transom and car-bolster, with the bearing at one end shown in section. Fig. 3 is a section of the car, of the transom, and bolster, with the bearing interposed between them. Fig. 4 is a perspective of the bearing and the under support.

A indicates the side frame of the car-truck, and B the transom. The truck-frame shown in the drawings is one of modern character, made from plates of metal properly pressed and bent, so that the transom is practically a tubular body that extends across between the side frames of the truck. The invention may be applied to other forms of trucks, however, and will be equally useful with any form of truck.

A central casting supported by the transom engages with a counter-casting D, that is bolted to the bolster E of the car-body. The bolster E is also made of plates of metal properly cut, bent, and riveted together.

Between the side walls of the transom D and near the outer ends is supported a lower side bearing-plate $a$, the upper surface of which is a portion of the surface of a cone which has its apex at $x$, the lowermost point of the globular engaging part of the casting D. The upper surface of the bearing-plate $a$ is slightly curved, but any given point on the bearing-line traverses a line on the bearing-plate that is horizontal.

On the under side of the bolster E, vertically above the bearing-plate $a$, is a second bearing plate or cap $b$, the under surface of which is a cone-surface the apex of which is at the same point $x$. The bearing-plate $a$ is provided at that side of it which is farthest from the center with a vertical wall $a'$, which arches around the center $x$. The plate is provided at the inner end also, or on that side which is nearest to the center $x$, with a second vertical wall, which also arches around the center $x$. The upper bearing-plate $b$ is provided with downward-dropping walls $b'$ $b^2$ at its outer and inner sides, which arch around the center $x$. In the corner between the bearing-plate $a$ and the vertical wall $a'$ are a number of holes equally spaced to engage after the fashion of the teeth of the rack with the teeth of the rocker, hereinafter described. This rack is made with bars and holes in order that any dirt which may accumulate on the bearing may work out and drop through them. In the corner between the upper bearing-plate $b$ and the wall $b'$ are similar teeth and similar holes, making a rack to engage with the upper teeth of the rocker R.

Between the upper and lower bearing-plates is interposed a rocker R—that is, a portion of the frustum of a cone of which the apex would be at the center $x$. At its larger end it is provided on the upper and lower sides (which are cone-faces) with teeth $r\ r'$, that engage in the respective racks of the upper and lower bearing-plates, and each is provided with smooth conical surfaces $r^2\ r^3$, which engage with the opposed conical surfaces of the bearing-plates $a$ and $b$.

What may be termed the "vertical" sides of the rocker are concaved or drawn in at the sides, so that while the lower side of the rocker is inserted low down between the side walls of the transom and extends nearly across from one to the other of the sides of the transom and the upper side of the rocker is inserted between the depending side walls $s\ s$ of the top bearing-plate and extends nearly across from side to side between them the middle part has considerable freedom of movement between the inturned flanges of the upper sides of the transom side plates, and the truck can swing through a considerable arc before there will be any resistance to such swinging by the engagement between the rocker and the sides of the transom. The side walls of the transom constitute, in effect, a box partially inclosing the rocker and serve as an exterior means for preventing the displacement of the rocker. There is a corresponding side bearing on the opposite end of the truck or between the opposite end of the truck and the opposite end of the bolster, and these bearings, while they almost entirely prevent any rocking motion of the car on the truck, allow a sufficient freedom of rotary motion of the truck under the car, and the walled-in top and bottom plates effectually prevent the escape of the rocker from its proper position.

The rocker presents at the upper and lower bearings surfaces which roll on the bearings, and there is consequently little or no liability to grinding or cutting action between the rocker and the bearing-plates, and there is a minimum of motion of the rocker itself, because the relative motion and rotation of the truck under the car is twice that of the rocker, and there is no slipping of one part on the other, as is the case when an axle-roller is interposed between the top and bottom bearings. Furthermore, the weight of the car will rest at three points on the truck, and therefore the truck will turn more easily under the car and the car cannot rock on its central pin.

In some forms of car-truck there is not sufficient distance between the top of the truck transom or frame and the upper side of the car or bolster to interpose a rocker of the proper length. Such is the case in the form herein shown, and consequently I have placed the lower bearing-plate $a$ within the side walls of the transom B and below the upper margins thereof, as clearly shown in Fig. 3. This form of construction I believe to be entirely novel and is herein specifically claimed.

What I claim is—

1. In a side bearing for railway-cars, the combination of an upper inclined bearing-surface, a hollow truck-transom, a lower inclined bearing-surface located within said hollow transom, and a generally oblong rocker between said bearing-surfaces and having oppositely-disposed inclined segmental bearing-surfaces working on said upper and lower bearing-surfaces, whereby the side walls of the transom prevent the displacement of the rocker, substantially as described.

2. In a side bearing for railway-cars, the combination of an upper inclined bearing-surface, a hollow truck-transom, a lower inclined bearing-surface located within said hollow transom, and a rocker between said bearing-surfaces and having oppositely-disposed inclined segmental bearing-surfaces, and inbent connecting sides, the side walls of the transom extending up substantially half-way the sides of the rocker, whereby the side walls of the transom prevent the displacement of the rocker, substantially as described.

3. In a side bearing for railway-cars, the combination with a bolster, and a truck-transom each provided with an inclined surface, of a generally oblong rocker between the same having oppositely-disposed inclined segmental surfaces working on said bearing-surfaces, and having inbent sides connecting said segmental surfaces, and retaining-walls adjacent the inbent sides of the rocker between which it is located and which prevent the displacement thereof, substantially as described.

4. In a side bearing for railway-cars, the combination of an upper and a lower conical-surfaced bearing-plate, each provided with an end wall, a generally oblong rocker between said bearing-plates having oppositely-disposed segmental conical surfaces working on said bearing-plates and having concaved side walls, and retaining-walls adjacent said concaved walls of the rocker, between which it is located and which prevent the displacement thereof, substantially as described.

5. In a side bearing for railway-cars, the combination with a bolster, and a truck-transom, of an inclined bearing-plate on the bolster, an inclined bearing-plate positioned in a cavity in the transom, a rocker between said plates having oppositely-disposed inclined segmental surfaces working on said bearing-plates and having inbent side walls, substantially as described.

In testimony whereof I sign this specification in the presence of two witnesses.

WILLIAM W. WOOLL.

Witnesses:
CHARLES F. BURTON,
MARION A. REEVE.